Dec. 3, 1968  J. C. SELLERS  3,414,120
PACKAGING MATERIAL
Filed June 10, 1966
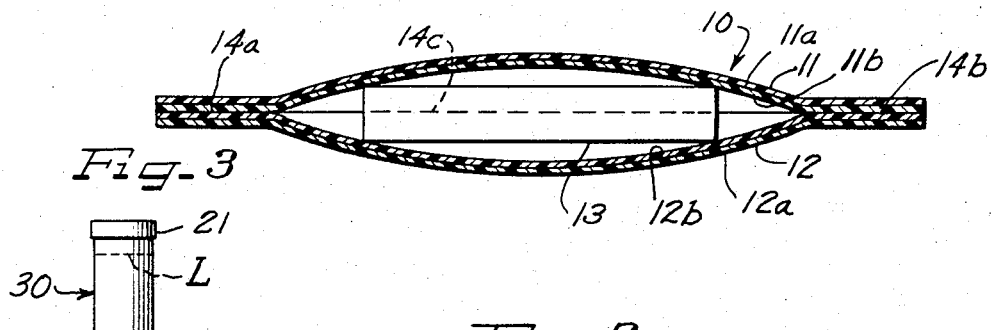
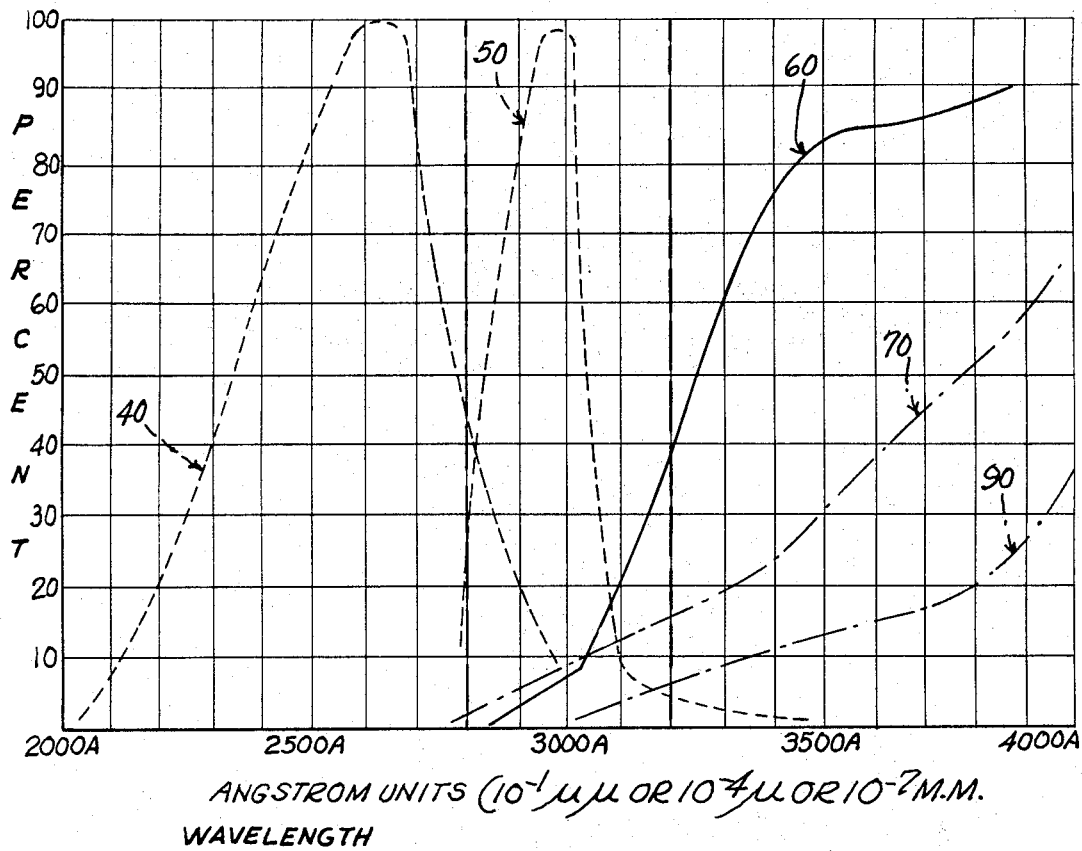
INVENTOR.
John C. Sellers
BY Hill, Sherman, Meroni, Gross & Simpson ATTORNEYS

United States Patent Office 3,414,120
Patented Dec. 3, 1968

3,414,120
PACKAGING MATERIAL
John C. Sellers, Barrington, Ill., assignor to General Binding Corporation, Northbrook, Ill., a corporation of Illinois
Filed June 10, 1966, Ser. No. 556,621
3 Claims. (Cl. 206—46)

ABSTRACT OF THE DISCLOSURE

The instant invention relates to packaging material and the resultant package obtained by the use thereof, and more particularly, to a packaging material and package that is uniquely adapted to afford an effective packaging material which will permit sterilization of the contents thereof, after completion of the packaging, and without the necessity of either repeating sterilization later or opening, closing or otherwise tampering with the package itself subsequent to such sterilization, up to the ultimate time of desired use of the contents.

---

The packaging material used for affording a window in the package to permit entrance of germicidal ultraviolet light is preferably formed of a plurality of laminae adhered to each other along substantially coextensive contiguous surfaces thereof, with one of such laminae being formed of heat-sealable synthetic resinous material and another of such laminae being formed of a resinous material different from the first lamina and providing structural strength for the resultant sheet formed by such plurality of laminae.

In other words, the instant packaging material, and the package resulting therefrom, permits sterilization of the contents of the package, after the package enclosure itself has been completely sealed to form a generally fluid-impervious barrier for protecting the contents or body of material therein against an ambient environment, such as air, moisture, various contaminants, virulent bacteria, etc. The material is sealed in the instant package and, then, because of the unique character of the instant package, it is possible to expose the body of material within the package of germicidal ultraviolet light for purposes of sterilization, without the necessity of breaking the sealed package. The package itself may be provided with a window of laminated sheet material, or it may consist essentially entirely of such laminated sheet material, which laminated sheet material is capable of transmitting substantial quantities of incident germicidal ultraviolet light. The laminated sheet material used herein is fluid-impervious, flexible and thin, so as to be substantially transparent to germicidal ultraviolet light (i.e. preferably at least about 50% transparent, and for best practice at least about 70% transparent to germicidal ultraviolet light). It is known that germicidal ultraviolet light is generally within the range of about 2100 Angstroms to about 2900 Angstroms, expressed 2100 A. to 2900 A. herein. The package of the instant invention is unique in that it is composed of at least two laminae, one of which provides a substantial portion of structural strength (in spite of the fact that it is used in the form of a very thin sheet) so that the package itself will withstand ordinary handling and use. Also, one such lamina included in the laminated sheet is a thermoplastic synthetic resinous material that is readily heat-sealable, and this material is also used in relatively thin sheet or layer form, so as to accommodate the desired relatively high transparency toward germicidal ultraviolet light, while still affording sufficient overall structural strength in the laminated sheet to permit handling of the package during ordinary use.

It is, therefore, an important object of the instant invention to provide an improved flexible thin laminated sheet material adapted for use as a packaging material, that will accommodate sterilization of the contents of the package by the use of germicidal ultraviolet light.

Another object of the instant invention is to provide a package portion opposite or generally co-extensive with the position of the packaged material that is of such structure as to afford sterilization of such material within the package or contents by the use of an external source of germicidal ultraviolet light to be transmitted through a thin generally transparent sheet or window at the position of such package portion.

Yet another object of the instant invention is to provide a package which consists essentially of a body of material to be packaged and sterilized while in the package and an enclosure material which will transmit germicidal ultraviolet light to effect such sterilization and will at the same time possess the required flexibility and general structural characteristics to effect retention of the package enclosure during ordinary handling of the material subsequent to sterilization thereof, such enclosure material also being visible-light transparent and formed of a flexible frangible thin sheet material that can be ruptured, if necessary, with relative ease when and if it is desired to use the sterilized contents of the package.

Other and further objects, features and advantages of the present invention will become apparent to those skilled in the art from the following detailed disclosure thereof and the drawings attached hereto and made a part hereof.

On the drawings:

FIGURE 1 shows generally a sectional elevation view of a package embodying the instant invention;

FIGURE 2 is a chart showing generally the relationships between germicidal ultraviolet light and other known radiations; such chart showing percentages numerically along its ordinate and wavelength distribution numerically along its abscissa; and FIGURE 3 is an essentially schematic elevational view of another package embodying the invention.

In FIGURE 1, it will be seen that there is shown a package indicated generally by the reference numeral 10 embodying the instant invention and composed of a top laminated sheet 11 generally co-extensive with a bottom laminated sheet 12. In one embodiment of the instant invention the top sheet 11 is composed of an outside lamina 11a, exposed to the ambient environment of the atmosphere, for example, which outside lamina 11a is formed of a thin 0.5 mil biaxially oriented polypropylene sheet. The inside lamina 11b of the laminated sheet 11 is formed of a 2 mil thick medium density (approximately 0.930) polyethylene sheet. The inside lamina 11b is exposed directly to a body 13 that is enclosed in the package 10 of FIGURE 1 and is shown in full elevational view in the view of FIGURE 1. The body 13 is indicated merely as being a flat generally planar element with the appearance of a rectangle inside elevation as shown. The bottom sheet 12 is composed of an outside lamina 12a that has the same structure as the previously described outside lamina 11a, and an inside lamina 12b that has the same structure as the previously described inside lamina 11b. It will be seen that the opposed inside laminae 11b and 12b have been heat-sealed surroundingly or around the periphery of the body 13, as indicated at the contiguous surface portions 14a along the lefthand side of FIGURE 1, 14b along the righthand side of FIGURE 1 and also at the line 14c shown running behind the body 13 and representing generally the plane of the contiguous heat-sealed faces at the rear of the body 13 in the sectional view of FIGURE 1. In completing the exemplary package enclosure 10 shown in FIGURE 1, it will be appreciated that contiguous heat-sealed faces 14a, 14b, 14c, etc. are present to form the desired fluid-impervious heat-seal between the polyethylene laminae 11b and 12b around substantially the entire periphery of the substantially co-extensive sheet portions 11 and 12. It will be appreciated that the sheet portions 11 and 12 can advantageously be formed of the same piece of sheet material folded upon itself, for example, along the line here indicated at 14c in FIGURE 1; or the sheet elements 11 and 12 may be separate and distinct sheet elements that are substantially co-extensive for purposes of surrounding and enclosing the particular body 13 and maintaining it in the generally central position of the body 13 here shown (by virtue of the heat-sealing between the sheets around the general periphery thereof).

In another embodiment of the instant invention the outer lamina 11a is again formed of a 0.5 mil thick biaxially oriented polypropylene sheet, onto which is extrusion coated a lower density (0.915) polyethylene coating of substantially 1.5 mils thickness, which forms the inner heat-sealable lamina 11b. The opposite laminated sheet 12 may, of course, have the previously described polypropylene-polyethylene structure or its laminae 12a and 12b may correspond substantially to the chemistry and structure of the most recently described laminae 11a and 11b, respectively. It will also be appreciated that the sheet 11 or 12 may be composed of more than two laminae, however, it is important that at least one of the laminae that provides an exposed surface for the laminated sheet 11 or 12 should be a lamina such as 11b or 12b, which is heat-sealable polyethylene material of relatively non-tacky surface characteristics and preferably not more than medium density (i.e. about 0.9 to 0.94 density, and best results at substantially 0.915 to 0.925 low density). Such low density polyethylene apparently gives superior U.V. transmission in its amorphous ("quenched" type) condition and without loss of such ability when used with nominal amounts of compatible transparent antiblocking agents. It is also apparent that such polyethylene lamina 11b or 12b must have a sufficient relatively nominal thickness to at least afford fluid impervious heat-sealability. Such thickness may range from about 0.5 to about 3 mils, but is preferably within the range of about 1 to 2.5 mils thickness. The polyethylene lamina 11b or 12b has, of course, definite thickness and provides an element of structural strength to the flexible laminated sheet 11 or 12, but it also provides the particularly significant function of being capable of forming the fluid-imprevious seal by application of heat and pressure vis-a-vis means defining a cooperating second surface which second surface will be a package portion in the use here contemplated. In other words, the second surface for the lamina 11b is the lamina 12b in the embodiment of FIGURE 1. It will be appreciated, however, that the sheet 12 shown in FIGURE 1 could be formed of some other suitable fluid-impervious protective or barrier package material, so long as at least one sheet 11 or 12 possesses the essential transparency to germicidal ultra-violet light here required, and so long as the body 13 in the predetermined position shown in the package is also capable of transmitting germicidal ultraviolet light. Thus, if the body 13 is simply a solid body such as a surgical tool or instrument, then sterilization by the use of germicidal ultraviolet light will require exposure of all of the surfaces of such body 13 to the germicidal ultraviolet light and both the top and bottom laminated sheets 11 and 12 would ordinarily have to be formed of the material already described for purposes of transmitting substantial quantities of germicidal ultraviolet light through such laminated sheets 11 and 12 to the location or position of the body 13 so as to expose all surfaces thereof to such germicidal ultraviolet light. On the other hand, in the situation wherein a generally transparent liquid body is to be packaged in the place of the body here indicated at 13, for example, in a simple cylindrical package indicated at 30 in FIGURE 3 with a solid opaque cap 21, then it will be appreciated that the germicidal ultraviolet light may be caused to pass through only a portion of the total package enclosure, indicated at 10 in FIGURE 1 and indicated generally at 30 in FIGURE 3, in order to ultimately expose all of the contents of the package to germicidal ultraviolet light.

In referring to the manner in which exposure by germicidal ultraviolet light occurs, it will be appreciated that in either package 10 or 30 there will be a body of material. In the package 10 the body of material is indicated at 13 and it is shown being retained in a predetermined position which is for all intents and purposes substantially identical to the actual physical position of the body 13 shown in the view of FIGURE 1. In FIGURE 3, however, there is indicated a level L of liquid within the transparent body of the package 30. The transparent body of the package 30 may be formed simply of opposed heat-sealed sheets (substantially as indicated in FIGURE 1) or it may be composed of a single visible and ultraviolet transparent sheet wrapped to form a cylinder. Such sheet preferably has a middle polypropylene lamina 11a with polyethylene laminae 11b, 12b extrusion coated onto both sides thereof, since it is preferable to end up with the opposed contiguous surface areas or regions of the package which will ultimately complete the enclosure being formed of the heat-sealable polyethylene previously described, so that the advantage of heat-sealing between opposed polyethylene surfaces may be employed (for the reason that conventional heat-sealing with one polypropylene surface and one polyethylene surface, for example, is not as effective and often not satisfactory).

In FIGURE 3, the cap 21 is indicated schematically as being an opaque element which would presumably preclude direct exposure of the top side of the liquid level L to germicidal ultraviolet through the top cap 21 in the package 30, but because the liquid material therein is transparent, it will be understood that exposure to germicidal ultraviolet will effect sterilization even if such exposure is made only from a single outside source and only against a single portion of the laminated sheet or wall 20 indicated schematically in FIGURE 3.

As indicated previously, the low to medium density polyethylene lamina 11b or 12b is employed to provide at least one of the exposed surfaces of the laminated sheet material 11 or 12, in order to provide the advantages of a fluid-impervious heat-seal at localized regions (14a, 14b, 14c) in the manner previously described. In general, this will mean that the polyethylene lamina 11b or 12b will ordinarily be exposed to the interior of the package 10 and to the body of material 13 therein. Such polyethylene lamina 12b or 11b is not so heat-responsive that it is tacky or otherwise inclined to stick to the body 13 or afford comparable undesirable side effects. The polyethylene lamina 12b or 11b is functional to provide the heat-seal, but generally under other conditions of the "ambient environment" it is not responsive relative to any undesirable side effects and such lamina 11b or 12b may be considered to be inert relative to the contents of the package. The laminated sheets 11 and 12 are essentially formed of laminae that are within a generally known class of $C_2$–$C_3$ alkylene polymers, i.e. ethylene and propylene polymers. The ethylene polymers known as "polyethylenes" have already been described more specifically in connection with the interior laminae 11b and 12b of the package 10. The second category of lamina 11a or 12a of significance in connection with the instant invention involves the use of polypropylene, for the reason that this material does afford an additional element of structural strength and resistance to ambient temperature extremes. The polypropylene is formed initially (and/or generally offered for sale) in the form of biaxially oriented polypropylene sheet material. The material used in the practice of the instant invention is of minimum thickness (i.e. substantially 0.2 to 1.5 mils, and preferably about 0.5 mil thickness) in order to carry out the essential functions of the instant invention, while still affording maximum transparency to germicidal ultraviolet light. The biaxially oriented polypropylene sheet (for example, of 0.5 mil thickness) is preferably extrusion-coated in the practice of the instant invention with the coatings of polyethylene herein-before described. It is essential to obtain extremely good adherence between the contiguous faces of the polypropylene and polyethylene laminae in order to provide an effective packaging material and resultant package; and it is also recognized that it is sometimes quite difficult to obtain good adherence between such materials as polypropylene and/or polyethylene because of a generally inherent self-lubricating surface characteristic (evidenced by the somewhat waxy touch of these materials at room temperature), which is a known characteristic. On the other hand, by the use of the device of extrusion coating of the medium to low density polyethylene onto the biaxially oriented polypropylene sheet, it is possible to obtain good adhesion. This is particularly true when a commercially available primer is applied initially to the polypropylene just ahead of the extrusion coating application of the polyethylene or even without a primer using commercial polypropylene available in the trade in surface pre-treated condition by use of corona discharge, flame spraying, halogen exposure, all of which procedures are used for pretreatment for printing. In the case of the first described laminated sheet 11, a commercial (polyethylene polyamine) primer was applied to the 0.5 mil thick biaxially oriented polypropylene in a very nominal amount of about 0.2 pound per ream (432,000 sq. in.), just prior to the extrusion coating of the two mil thick medium density (0.93) polyethylene coating; whereas in the second procedure described the 0.5 mil biaxially oriented polypropylene had only 0.1 pound per ream of primer applied thereto just prior to the extrusion coating thereon of the 1.5 mils thick lamina of low density (0.915) polyethylene. Examination of the two laminated films prepared in this manner revealed that the first-mentioned film was 74% transparent to germicidal ultraviolet light and the second film was 80.5% transparent to germicidal ultraviolet light. It has also been found that illumination of the primer permits substantially the same adhesion and perhaps better transmission. In either case, it will be appreciated that the extremely high transparency to germicidal ultraviolet light affords rapid and inexpensive sterilization of the contents of the package, by virtue of the transmission of such germicidal ultraviolet light through the laminated sheet walls 11 or 12 and to the "position" of the body 13 retained within the package. Reference is made to the position of the body 13, for the reason that the "window" function of the laminated sheets 11 and 12 is such that they are necessarily opposed to the position of a solid immovable body 13 in the package such that this particular position (i.e. that of the body 13) may be exposed entirely to germicidal ultraviolet radiation and all surfaces of a solid body 13 would thus be sterilized. As previously mentioned, the situation is somewhat less complicated when sterilization of the liquid contents of a package is involved, in such instances when such liquid is in fact transparent to germicidal ultraviolet radiation. Thus, in a truly clear and transparent liquid the problem is simplified; whereas in the case of a suspension of partially opaque material in a liquid, sterilization is accomplished possibly by only shaking the package to move the material around in the liquid, or it may require exposure of the type already described in connection with the solid body 13, i.e., from substantially all sides of the position of the body. In any event, exposure of this type is easily accomplished in the package of the instant invention and the packaging material of the instant invention is readily adapted for this particular purpose, since the packaging material can be used to form substantially the entire package for any given material, for example, as shown in FIGURE 1.

It should also be noted that the physical character of the polyethylene-polypropylene laminated packaging sheets 11 and 12 is such that the packaged material may be submerged in boiling water and/or retained under freezing conditions without damage to the package. The thin flexible sheets 11 and 12 have more than adequate strength under extremes of temperature in the ambient environment so as to maintain an integral package. On the other hand, such thin sheets can be readily broken, i.e., they are frangible in the sense that the package can be readily broken when it is desired to break open the package and use the sterilized contents 13 therein.

Reference is made to FIGURE 2 herein to indicate generally the radiations of interest in connection with the practice of the instant invention. It will be seen that in FIGURE 2 the Angstrom units are indicated from 2000 A. to 4000 A. along the abscissa; whereas the ordinate specifies numbers from 0 to 100, which may be used for reference in connection with figures ranging up to 100%. Thus, the curve indicated in dashed lines at 40 shows the significant germicidal ultraviolet light. The curve 40 shows that at approximately 2100 Angstroms the germicidal effect is only approximately 10%, whereas approximately 100% germicidal effect is obtained at a wavelength of 2600 Angstroms, and the germicidal effect then diminishes as the wavelength goes on up to about 2900 or 2950 Angstroms, where it is again about 10%. In reference to germicidal ultraviolet light used in the practice of the instant invention, it will be appreciated that this is light having a wavelength within substantially the range of 2100 Angstroms to 2950 Angstroms (although obviously preferably about 2600 to 2700 Angstroms). The next dashed line curve 50 given for reference in FIGURE 2 shows the corresponding erythremal (or sunburning) effect of light, with peak effect at about 3000 Angstroms. The solid line curve indicated generally at 60 in FIGURE 2 shows approximately the percent transmissibility or percent transparency of plateglass. It will be seen that plateglass is thus substantially opaque to germicidal ultraviolet. For example, at the extreme bottom of the curve 60 it will be seen that only about 5% of ultraviolet light of 2950 Angstroms is transmitted through plateglass, and the curve 40 shows also that such ultraviolet light is only about 10% effective for germicidal purposes, hence, the use of plateglass reduces the germicidal effect down to a minute figure in the region of substantially 0.5% effectiveness for germicidal purposes. The dot-dash line indicated generally at 70 in FIGURE 2 represents generally the overall distribution of the radiation received on earth from the Zenith sun, and it will be seen that the amount of germicidal ultraviolet light thus received is minimal, being slightly more than that which plateglass (curve 60) will actually transmit at the upper end of the germicidal range in the neighborhood of 2900 to 2950 Angstroms; but it will be appreciated that time is an element in the germicide function. Hence, substantial exposure to sunlight may afford sufficient time for accomplishment of significant "natural" germicidal effect from the sunlight. In the practice of the instant invention, of course, an object of the use of the instant packaging material and package is to afford rapid sterilization by exposure to appropriate germicidal ultraviolet light sources, such as mercury arc lamps, etc. In such instances the distribution curve (not shown) for germicidal ultraviolet light will show peaks in the germicidal wavelength, as contrasted to the minimal portion of ultraviolet light in this range that is provided by sunlight according to the curve 70. The curve indicated at 90 is merely an academic representation of the approximate light distribution for an ordinary incandescent light; and this is shown only to point out that suitable germicidal ultraviolet light sources are employed in the practice of the instant invention and not ordinarily sunlight or ordinary incandescent lamps. By the use of a mercury arc lamp, for example, with a peak in its distribution curve at approximately 2500 Angstroms is found to be particularly effective in the practice of the instant invention and, it is on the basis of the use of germicidal ultraviolet light sources of this character that the general limitation of at least substantially 50% transparency, and preferably at least substantially 70% transparency is specified as significant in connection with the practice of the instant invention and the use of the sheet materials 11 and 12 for packaging and sterilization purposes in the manner hereinbefore described.

It will thus be appreciated that, because of the ability of the particular polyethylene-polypropylene laminated sheet materials 11 and 12 to resist boiling water temperature and the like, it is possible to facilitate sterilization by such other practices, at least in the case of certain materials. In a simple demonstration of the invention, packages made according to the view of FIGURE 1 using the 74% transparent laminated sheets and the 80.5% transparent laminated sheets (with such transparency based upon germicidal ultraviolet light transparency) were made enclosing clear solutions contaminated with microorganisms. The test material actually used was a contact lens cleaner, which is substantially transparent to germicidal ultraviolet light, and the package material was exposed to the mercury as germicidal ultraviolet light source for limited periods of time, to establish that all of the microorganisms in the contents of the packages were readily killed within very nominal periods of time, not substantially greater than would be required using direct exposure of the culture to germicidal ultraviolet light in view of the extremely high transparency of the laminated sheet material toward the germicidal ultraviolet light.

It will be understood that modifications and variations may be effected without departing from the spirit and scope of the novel concepts of the present invention. The instant laminates are translucent and preferably in the practice of the invention such laminates are transparent to visible light so that the material packaged therein is visible to the eye.

I claim as my invention:

1. A flexible frangible thin sheet adapted for use as a generally fluid-impervious barrier for protecting a body of material against an ambient environment, said sheet comprising a plurality of laminae adhered to each other along substantially co-extensive, contiguous surfaces thereof, one such lamina being formed of a thermoplastic first organic synthetic resinous material and presenting an exposed sheet surface adapted to form a generally fluid-impervious seal by application of heat and pressure vis-a-vis means defining a cooperating second surface, another such lamina being formed of a second organic synthetic resinous material different from said first and providing structural strength generally resistant to ambient heat and cold, said sheet being substantially transparent to light in the range from germicidal ultraviolet light through visible light and said sheet consisting essentially of said one lamina in the form of a substantially 1.5 to 2 mil thick polyethylene coating adhered by extrusion coating onto a substantially 0.5 mil polypropylene layer forming said another lamina and presenting an exposed non-tacky surface adapted for use as the outside surface of a package, said polyethylene coating presenting local surface areas adapted for heat-sealing against other surface areas thereof.

2. In a package for enclosing a body of material in a given position therein, a flexible frangible thin generally fluid-impervious barrier sheet protecting such position against an ambient environment and adapted to expose such position to germicidal ultraviolet light transmitted through such sheet, said sheet comprising a plurality of laminae adhered to each other along substantially co-extensive contiguous surfaces thereof, one such lamina being formed of a thermoplastic first organic synthetic resinous material and presenting an exposed sheet surface to such position for enclosing such body of material in such position by a generally fluid-impervious heat seal with means completing the package enclosure, another such lamina being formed of a second organic synthetic resinous material different from said first and providing structural strength generally resistant to ambient heat and cold, said sheet being substantially transparent to light in the range from germicidal ultraviolet light through visible light and said sheet consisting essentially of said one lamina in the form of a substantially 1.5 to 2 mil thick polyethylene coating adhered by extrusion coating onto a substantially 0.5 mil polypropylene layer forming said another lamina and presenting an exposed non-tacky surface adapted for use as the outside surface of a package.

3. A packaging consisting essentially of a body of material adapted to be sterilized and a generally fluid-impervious enclosure for retaining such body of material in a given position therein and protecting such body from an ambient environment, said enclosure including a flexible frangible thin sheet adapted to expose the body therein to an external source of germicidal ultraviolet light to be transmitted through such sheet, said sheet comprising a plurality of laminae adhered to each other along substantially coextensive contiguous surfaces thereof, one such lamina being formed of a thermoplastic first organic synthetic resinous material and presenting an exposed sheet surface adapted to form a generally fluid-impervious seal by application of heat and pressure vis-a-vis means defining a co-operating second surface, another such lamina being formed of a second organic synthetic resinous material different from said first and providing structural strength generally resistant to ambient heat and cold, said sheet being substantially transparent to light in the range from germicidal ultraviolet light through visible light and said sheet consisting essentially of said one lamina in the form of a polyethylene layer forming the package interior exposed to said body and said another lamina is a polypropylene layer adhered to said one laminae and defining the exterior package surface.

References Cited

UNITED STATES PATENTS

| | | | |
|---|---|---|---|
| 1,077,835 | 11/1913 | Kelly | 206—47 |
| 1,607,626 | 11/1926 | Hopkinson | 206—84 X |

FOREIGN PATENTS

| | | |
|---|---|---|
| 700,482 | 12/1964 | Canada. |
| 1,354,131 | 11/1964 | France. |

JOSEPH R. LECLAIR, *Primary Examiner.*

J. M. CASKIE, *Assistant Examiner.*